United States Patent Office 3,048,620
Patented Aug. 7, 1962

3,048,620
TERTIARY AMINO ALKYLATED AMIDES
John D. Spivack, Spring Valley, N.Y., assignor to Geigy Chemical Corporation, Ardsley, N.Y., a corporation of Delaware
No Drawing. Filed Aug. 3, 1959, Ser. No. 831,019
8 Claims. (Cl. 260—471)

The present invention relates to novel and useful tertiary-amino alkylated amides. These new compounds may be represented conveniently by the following formula:

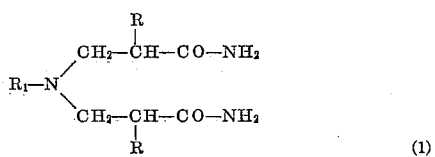

(1)

wherein $R_1$ represents a hydrocarbon radical, preferably an alkyl radical with a chain length of 1 to 18 carbon atoms inclusive, a hydroxyalkyl radical, preferably lower hydroxyalkyl with a chain length of from 1 to 6 carbon atoms inclusive, the phenyl radical, substituted phenyl, preferably lower alkylphenyl, lower alkoxy phenyl, carbalkoxyphenyl, halophenyl, the

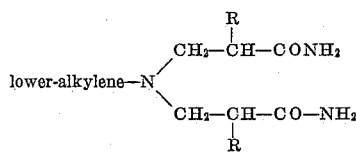

group, and the

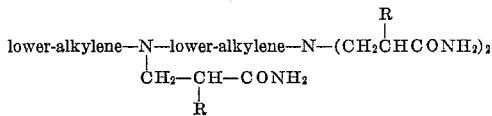

group and R represents hydrogen or a lower alkyl radical. Throughout this specification lower alkyl and lower alkylene generally signify a group with from 1 to 6 carbon atoms.

The new tertiary-amino alkylated amides (1) of the present invention are characterized by a wide variety of uses. Thus, they are useful as hardeners for epoxy resins, as antistatic agents for nylon, as acid-corrosion inhibitors, etc. They are also useful as intermediates for the preparation of bridge N-substituted dialkylenetriamines which themselves are useful as corrosion inhibitors. Preferred for use as an effective hardener for epoxy resins are N-methylimino-bis-propionamide and the like. Preferred compounds (1) for use as antistatic agents for nylon are 2-hydroxyethylimino-bis-propionamide and N-methylimino-bis-propionamide, etc. Preferred as corrosion inhibitors are n-dodecyl-imino-bis-propionamide, n-octadecylimino-bis-propionamide and 2-ethylhexylimino-bis-propionamide.

The tertiary-amino alkylated amides according to the present invention can be obtained in several ways. One method involves the addition of an amine to an α,β-unsaturated amide, nitrile or ester, or carboxylic acid. The amide is obtained directly when the α,β-unsaturated amide is employed. In using the nitrile, the amide end-product is obtained on hydrolysis of the nitrile group of the intermediate. The use of the α,β-unsaturated ester involves the reaction of the intermediate tertiary amino alkyl carboxyl ester with ammonia to yield the desired tertiary amino alkyl carboxamide. The following reaction schemes illustrate these methods:

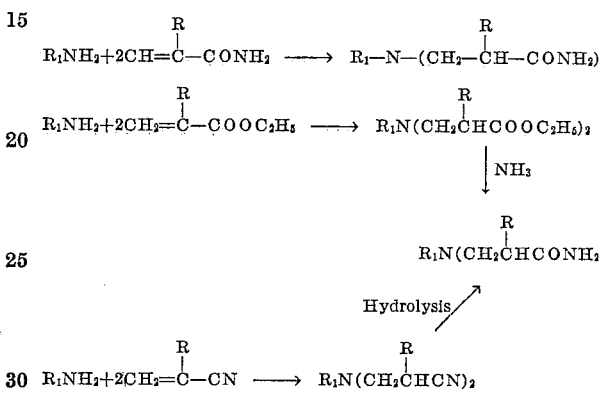

In the foregoing and subsequent illustrations R and $R_1$ are as hereinbefore defined.

The first method is further illustrated by the following reaction, wherein the use of a lower alkylene diamine as starting material is exemplified. It is understood that this example is illustrative merely and by no means is it meant to limit the present invention thereto. Thus, not merely ethylene diamine, but also any other suitable lower alkylene diamine and other polyalkylene polyamines can be used as starting material in this first method of synthesis.

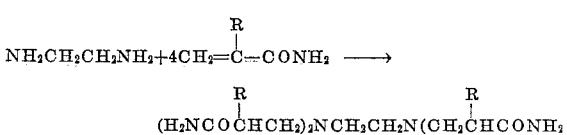

In a similar manner, suitable α,β-unsaturated ester acids or salts thereof and nitriles may be employed with the lower alkylene diamines to produce intermediate tetrasubstituted compounds which may be amidified or hydrolyzed, respectively, to produce the tetra-propion amides.

An alternate method for the production of the tertiary amino alkylated amides according to the present invention involves the adding to an α,β-unsaturated amide ester, acid or salt thereof, or nitrile, a suitable carbamoyl alkyl, carbalkoxyalkyl or cyanoalkyl secondary amine The following reaction scheme is illustrative of this method:

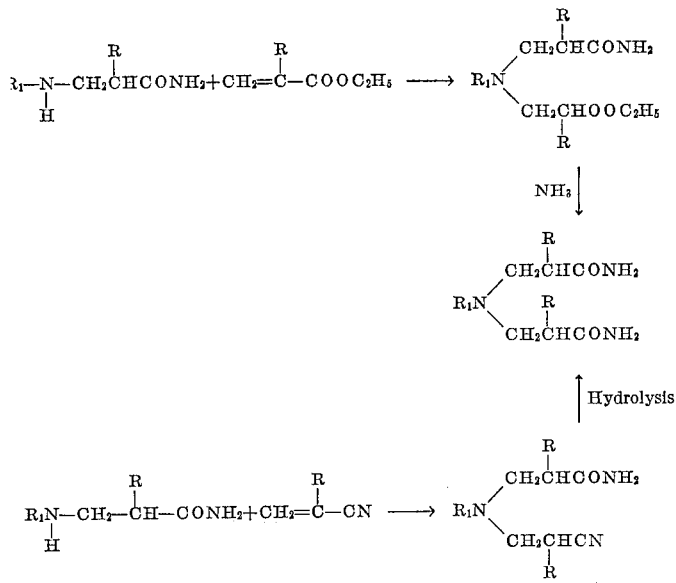

As hereinbefore set forth, the use of the nitrile or ester requires subsequent reaction of said nitrile or ester by hydrolysis or amidification with ammonia, respectively, in order to obtain the tertiary amino alkylamide.

In the foregoing alternate method of synthesizing the tertiary amino alkylamides of the present invention, the $\alpha,\beta$-unsaturated compound may be replaced by a suitable halogen compound or sulfate such as the following:

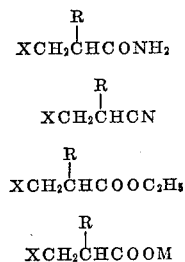

where R is as hereinbefore defined, M is hydrogen, alkali metal, or the ammonium radical, and X is halogen or $-OSO_3H$. The following reaction scheme illustrates the use of these compounds:

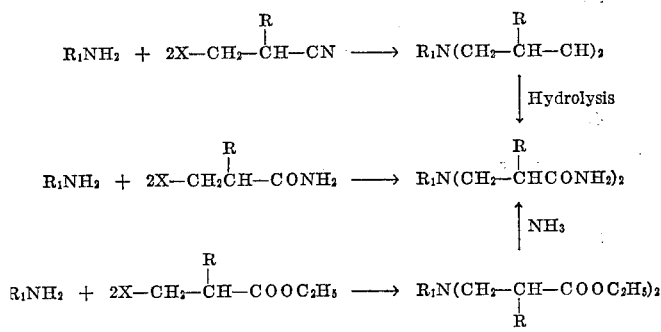

Thus, the tertiary-amino-bis-propionamide can be produced by suitable substitution reactions, as well as by addition reactions as hereinbefore set forth.

In the foregoing methods of synthesis it is understood that many other suitable starting materials, not specifically named, may be usefully employed in the practice of the present invention. For example, any suitable primary amine may be used as starting material, such as primary saturated aliphatic amines containing from 1 to 18 carbon atoms. Thus, methylamine, ethylamine, propylamine, butylamines, amylamines, hexylamines, heptylamines, octylamines, nonylamines, decylamines, tetradecylamines, hexadecylamines, octadecylamines may be used.

Similarly, suitable carbamoylalkyl secondary amines, as well as carbalkoxyalkyl and cyanoalkyl secondary amines may be employed. Thus, the corresponding methyl-, ethyl-, propyl-, butyl-, amyl-, hexyl-, heptyl-, octyl-, nonyl-, decyl-, tetradecyl-, hexadecyl-, octadecyl-derivatives of these secondary amines may be suitably employed.

Furthermore, unsaturated aliphatic primary amines, such as oleylamine, may be employed. Aromatic amines, such as aniline, o-, m- and p-chloroaniline, anisidine, o-, m- and p-phenylene diamine, o-, m- and p-aminophenol, the dichloroanilines, o-, m- and p-nitroanilines, etc. may be advantageously employed. The corresponding $\alpha$- and $\beta$-naphthylamines and their derivatives, such as chloronaphthylamines and hydroxynaphthylamines, may also be suitably employed.

Many lower alkylene polyamines may be employed to produce the tertiary amino alkylamides of the present invention, such as for example, ethylene diamine, diethylenetriamine, triethylenepentamine, tetraethyleneheptamine; also propylenediamine, dipropylenetriamine, tetrapropyleneheptamine. Similarly other lower polyalkylene polyamines may be employed.

Particularly suitable $\alpha,\beta$-unsaturated compounds for use in this invention are the acrylamides, and methacrylamides. The $\alpha,\beta$-unsaturated esters such as methylacrylate, ethylacrylate, and the methacrylates are also very useful. Acrylonitrile and methacrylonitrile are also particularly suitable $\alpha,\beta$-unsaturated nitriles for the practice of this invention.

Still another method of obtaining the tertiary amino reaction of alkylated amides of the present invention involves alkylating agents such as alkyl halides or sulfates with suitable iminodiesters, iminodicarboxy-acids, iminodicarboxamides or dinitriles. Any suitable halide, moreover, may be used. For example, the chlorides: methyl chloride, ethyl chloride, propyl chloride, butyl chloride, hexyl chloride, octyl chloride, dodecyl chloride, tetradecyl chloride, hexadecyl chloride, octadecyl chloride, and chloride derivatives such as benzyl chloride, also the bromides: methyl bromide, ethyl bromide, propyl bromide, butyl bromide, hexyl bromide, octyl bromide, dodecyl bromide, tetradecyl bromide, hexadecyl bromide, octadecyl bromide, and bromide derivatives, such as benzyl bromide, can be used advantageously.

Suitable sulfates may also be used. Thus, methyl acid sulfate, ethyl acid sulfate, hexyl acid sulfate, lauryl acid sulfate, octadecyl acid sulfate may be used. In a similar manner, although not represented by the illustrative sequence of reactions below, the symmetrical dialkylsulfates may be used: for example, dimethyl sulfate, diethyl sulfate, dipropyl sulfate, dibutyl sulfate, etc.

This method is especially advantageous when the same groups are the substitutents of the disubstituted secondary amine starting material of this method. Moreover, the desired amide is obtained directly when its substituted amino-alkyl carbamide is employed. Additional steps are required when suitable esters or nitriles are employed as hereinbefore set forth. Of course, if the iminodicarboxy-acid is used, then subsequent amidification is required. The following scheme of reactions illustrates the use of these alkylating agents in the present invention, without limiting the same thereto:

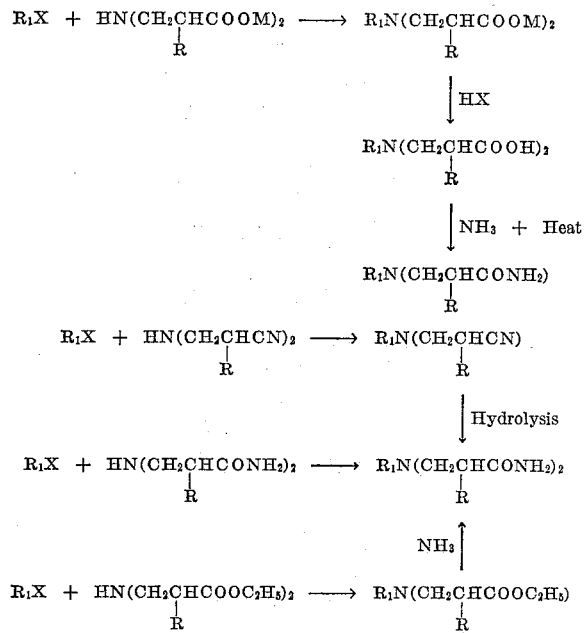

where R, $R_1$ and X have the same meanings as hereinbefore defined and M is an alkali metal or alkaline earth metal.

Other desired tertiary amino alkylamides of the present invention may also be obtained conveniently by replacing the aforesaid alkyl halide or sulfate by a suitable lower alkylene dihalide or disulfate. Any suitable dihalide may be used; for example, ethylene dichloride, ethylene dibromide, propylene dichloride and propylene dibromide. Sulfate esters also may be used advantageously; for example, ethylene di-acid sulfate, and propylene di-acid sulfate. The following reaction scheme is illustrative of the use of such dihalides and disulfates:

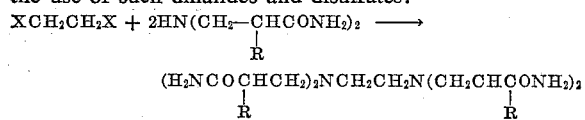

(R and H have the precedingly-defined significances.

Any suitable lower alkylene dihalide or disulfate also may be used with a suitable iminodicarboxamide. Similarly, the iminodiester, iminodinitrile, and iminodicarboxylic acids may be employed instead of the iminodicarboxamide with subsequent treatment as hereinbefore set forth.

The present invention is illustrated by the following presently preferred examples, but is by no means restricted thereto. In all examples, parts are by weight unless otherwise indicated. The relationship of parts by weight to parts by volume is the same as that between grams and milliliters. Temperatures are in degrees centigrade. Percentages are also by weight.

EXAMPLE 1

*Methylimino-Bis-Propionamide*

355 parts of acrylamide (5.0 moles) are dissolved in 500 parts by volume of water and the resultant solution is cooled to 10°. 152.6 parts of aqueous methylamine (40.6%; 2.0 moles) are added dropwise to said solution over a period of one hour, the temperature of the reaction mixture being kept below a maximum of 41° by cooling in an ice-water bath. The reaction solution is heated at 85 to 90° for six hours and concentrated to a pale yellow viscous syrup at 10 to 15 mm. Hg pressure. (Analysis of the reaction solution at the end of the heating period indicates 100% reaction.) The viscous syrup is triturated with 750 parts by volume of methanol and crystallizes spontaneously. The first crop of methylimino-bis-propionamide crystals is filtered (17 parts) and the filtrate is concentrated by removal of methanol by distillation. 250 parts by volume of isopropanol are added and an additional 102 parts of final product are obtained. Total yield is 81 percent of theory. The crystals melt at 109 to 110° and upon recrystallization from methanol they melt at 111–112° after drying.

*Analysis.*—Basic nitrogen equivalent weight: Calculated for $C_7H_{15}N_3O_2$, 173. Found, 177.

If, in the present example, 425 parts of methacrylamide are used instead of 355 parts of acrylamide, while otherwise proceeding as hereinbefore described, the final product methylimino-bis-($\alpha$-methyl propionamide) is obtained

EXAMPLE 2

*Ethylenediaminetetraproprionamide*

616 parts of ethylenediamine (85.6%, 8.8 moles) are added dropwise over a period of 45 minutes while stirring to an aqueous solution of 2982 parts of acrylamide (42) moles in 4700 parts by volume of water, the maximum temperature being kept at 40° by cooling with a water bath. The reaction mixture is heated at 85 to 90° for four hours and is then concentrated by distillation at 15 mm. Hg pressure until white crystals appear in the distillation flask. The residual liquors are allowed to crystallize spontaneously, the crystal slurry being diluted with an equal volume of methanol and filtered off by suction. The yield is 2714 parts (91% of theory) of N,N,N',N'-tetrakis - (2-carbamoylethyl)-ethylenediamine (ethylenediaminetetrapropionamide) melting at 171–172°

*Analysis.*—Nitrogen (Dumas) percent: Calculated for $C_{14}H_{28}N_6O_4$, 24.42. Found, 24.02.

EXAMPLE 3

*2-Ethylhexylamine-Bis-Propionamide*

130 parts of 2-ethylhexylamine are added dropwise over a period of about 20 minutes at 10° to a solution of 166.5 parts of acrylamide (2.3 moles) in 500 parts by volume of ethanol. The reaction mixture is heated while stirring at 85–90° for 6 hours. The resultant mixture is then concentrated by distilling off the ethanol at 15 mm. Hg pressure. The residual light yellow oil is dissolved in ether, freed of precipitated excess acrylamide by suction filtration, the ether being removed by distillation at atmospheric pressure and finally at 1.5 mm. Hg ressure. Analysis of the light yellow oil indicates that it consists of 93.3% 2-ethylhexylimino-bis-propionamide.

EXAMPLE 4 n-Dodecylimino-Bis-Propionamide 185 parts of n-dodecylamine (1.0 mole), dissolved in 0 parts of methanol, are added dropwise at 9 to 11° to solution of 166 parts of acrylamide (2.3 moles) in 500 arts of methanol while stirring.

The reaction mixture is then heated at 65° while stirring for 16 hours. 100 parts by volume of methanol are hen added and the reaction mixture is allowed to crystalize spontaneously. The n-dodecylamino-bis-propionimide, in form of white crystals, is filtered off, dried in acuum at 100 mm. Hg pressure at 60°. 274.5 parts are obtained (yield of 81.5%). The white crystals melt at 116 to 117°.

*Analysis.*—Nitrogen (Dumas) percent: Calculated for $C_{18}H_{37}N_3O_2$, 12.84. Found, 12.41.

Basic nitrogen equivalent weight: Calculated, 327. Found, 327.

EXAMPLE 5

Octadecylimino-Bis-Propionamide 177.5 parts of acrylamide (2.5 moles) are dissolved in 400 parts by volume of methanol. To this methanolic acrylamide solution is added, at 10°, a solution of 269 parts of n-octadecylamine dissolved in 500 parts by volume of methanol. The reaction mixture is warmed up to about 30°, whereupon a moderately exothermic reaction ensues, the temperature rising to 50°. When the reaction temperature begins to fall, the reaction mixture is heated at reflux for 9 hours. The reaction mixture is allowed to cool spontaneously to room temperature. The crystal slurry is diluted with an additional 400 parts by volume of methanol and the crystals filtered and dried. 373 parts of octadecylimino-bis-propionamide is thus obtained (yield 90% of theory). Octadecylimino-bis-propionamide is a white crystalline solid melting at 113 to 115°.

*Analysis.*—Nitrogen (Kjeldahl) percent: Calculated for $C_{24}H_{49}N_3O_2$, 10.22. Found, 10.10.

EXAMPLE 6

Anilino-Bis-Propionamide 93 parts of aniline are dissolved in 150 parts by volume of glacial acetic acid, the solution being heated to about 85°. 158 parts of acrylamide are added to the acetic acid solution over a period of 45 minutes; the addition reaction is exothermic and is held to a maximum temperature of 120° by removing the heat source and controlling the rate of addition. After complete addition of the acrylamide, the reaction mixture is heated at 80 to 82 for about 6 hours. The reaction mixture so obtained is diluted with 250 parts of water and made alkaline with aqueous sodium hydroxide. The resulting tan precipitate is filtered off and dried; it consists of 198 parts of anilino-bis-propionamide of about 95% purity, representing a yield of 80% of theory. Upon recrystallization from dioxane the anilino-bis-propionamide is obtained as while crystals, melting at 152° after drying.

*Analysis.*—Nitrogen (Dumas) percent: Calculated for $C_{12}H_{17}N_3O_2$, 17.87. Found, 17.64.

EXAMPLE 7

2-Hydroxyethylimino-Bis-Propionamide 156.4 parts of acrylamide (2.2 moles) are added to an aqueous soluton of ethanolamine, obtained by dissolving 61 parts of ethanolamine (1.0 mole) in 200 parts by volume of water. The reaction solution is then warmed at 70 to 80° for about 6 hours. The water is removed by distillation at about 15 mm. Hg pressure. The oily residue is then treated five times with about equal portions of acetone about 100 parts by volume each at 50 to 60° to remove acetone-soluble impurities. The acetone-immiscible phase is then freed of solvent by heating initially at about 60° and at about 15 mm. Hg pressure and then finally at about 3 mm. Hg pressure for several hours to free the product of volatile impurities. The residual oil is soluble in water, methyl, ethyl, isopropyl and butyl alcohols, as well as benzene, xylene and toluene, but is practically immiscible with acetone. The 2-hydroxyethylimino-bis-propionamide product is thus obtained in nearly quantitative yields as a viscous oil at 94.5% purity.

The percent application is a continuation-in-part of copending application Serial No. 777,587, filed December 2, 1958.

Having thus disclosed the invention, what is claimed is:

1. A tertiary-amino alkylated amide of the formula $$(H_2NCOCH_2CH_2)_2N\text{-lower alkylene-}N\text{-}(CH_2CH_2CONH_2)_2$$

2. A tertiary-amino alkylated amide of the formula $$\begin{array}{c} H_2NCOCH_2CH_2 \\ H_2NCOCH_2CH_2 \end{array}\!\!\!>\!\!N\text{-lower alkylene-}N\text{-lower alkylene-}N\!\!<\!\!\!\begin{array}{c} CH_2CH_2CONH_2 \\ CH_2CH_2CONH_2 \\ CH_2CH_2CONH_2 \end{array}$$

3. A tertiary-amino alkylated compound of the formula $$R_1\text{—}N\!\!<\!\!\begin{array}{c} CH_2CH_2CONH_2 \\ CH_2CH_2CONH_2 \end{array}$$

wherein $R_1$ is lower alkoxyphenyl.

4. A tertiary-amino alkylated compound of the formula $$R_1\text{—}N\!\!<\!\!\begin{array}{c} CH_2CH_2CONH_2 \\ CH_2CH_2CONH_2 \end{array}$$

wherein $R_1$ is lower carbalkoxyphenyl.

5. A tertiary-amino alkylated compound of the formula $$R_1\text{—}N\!\!<\!\!\begin{array}{c} CH_2CH_2CONH_2 \\ CH_2CH_2CONH_2 \end{array}$$

wherein $R_1$ is chlorophenyl.

6. A tertiary-amino alkylated compound of the formula $$R_1\text{—}N\!\!<\!\!\begin{array}{c} CH_2CH_2CONH_2 \\ CH_2CH_2CONH_2 \end{array}$$

wherein $R_1$ is hydroxyalkyl with from 1 to 6 carbon atoms inclusive.

7. Ethylenediaminetetrapropionamide.
8. 2-hydroxyethylimino-bis-propionamide.

References Cited in the file of this patent

UNITED STATES PATENTS

| | | |
|---|---|---|
| 2,411,662 | Martin et al. | Nov. 26, 1946 |
| 2,480,439 | Bersworth | Aug. 30, 1949 |
| 2,844,629 | Bruce et al. | July 22, 1958 |
| 2,856,427 | Bruce et al. | Oct. 14, 1958 |
| 2,921,085 | Schramm | Jan. 12, 1960 |

FOREIGN PATENTS

| | | |
|---|---|---|
| 242,950 | Switzerland | Nov. 16, 1946 |

OTHER REFERENCES

Franchimont et al.: "Travaux Chimiques des Pags, Bas," vol. 36, pages 90–109, page 95 relied on (1916).

Blumer: "Deutsche Chemische Gesellschaft Berichte," vol. 52B, pages 221–234, pages 223, 227, 230 and 231 relied on (1919).